US012083818B2

(12) United States Patent
Katsikas et al.

(10) Patent No.: US 12,083,818 B2
(45) Date of Patent: Sep. 10, 2024

(54) WRITING INSTRUMENT AND METHOD

(71) Applicants: BIC Violex Single Member S.A., Anoixi (GR); SOCIÉTÉ BIC, Clichy (FR)

(72) Inventors: Georgios Katsikas, Anoixi (GR); Etienne Michenaud, Clichy (FR)

(73) Assignees: BIC Violex Single Member S.A., Anoixi (GR); SOCIÉTÉ BIC, Clichy (FR)

(*) Notice: Subject to any disclaimer, the term of this patent is extended or adjusted under 35 U.S.C. 154(b) by 0 days.

(21) Appl. No.: 18/303,029

(22) Filed: Apr. 19, 2023

(65) Prior Publication Data

US 2023/0339256 A1 Oct. 26, 2023

(30) Foreign Application Priority Data

Apr. 20, 2022 (EP) .................................... 22305582

(51) Int. Cl.
*B43K 24/08* (2006.01)
*B43K 8/24* (2006.01)

(52) U.S. Cl.
CPC .............. *B43K 24/082* (2013.01); *B43K 8/24* (2013.01)

(58) Field of Classification Search
CPC ........ B43K 24/082; B43K 8/24; B43K 24/08; B43K 24/02; B43K 24/16; B43K 24/163
USPC ................................. 401/109, 112, 113, 117
See application file for complete search history.

(56) References Cited

U.S. PATENT DOCUMENTS 2,988,055 A 6/1961 Platt
3,558,233 A 1/1971 Zepell
3,740,159 A * 6/1973 Smagala-Romanoff .................... B43K 7/12 401/117
5,074,694 A 12/1991 Nakazato et al.
5,967,684 A 10/1999 Huang et al.
9,539,848 B2 * 1/2017 Bez ........................ B43K 5/005

(Continued)

FOREIGN PATENT DOCUMENTS

CN 201140608 Y 10/2008
CN 201721185 U 1/2011

(Continued)

OTHER PUBLICATIONS

KR 2001/76087 (abstract only) A Writing Implement Apr. 15, 2000.*

(Continued)

*Primary Examiner* — David J Walczak
(74) *Attorney, Agent, or Firm* — Bookoff McAndrews, PLLC

(57) ABSTRACT

A writing instrument between a first end and a second end including a writing element configured to transition between a non-writing state and a writing state, a first housing member oriented about at least a portion of the writing element and extending between the first end and the second end of the writing instrument, and an actuator configured to be moved between a first position and a second position, wherein the writing element is configured to transition from the non-writing state toward the writing state when the actuator moves from the first position toward the second position, and the writing element is configured to transition from the writing state to the non-writing state when the actuator moves from the second position toward the first position.

20 Claims, 3 Drawing Sheets

(56) References Cited

U.S. PATENT DOCUMENTS

| | | | |
|---|---|---|---|
| D823,944 | S | 7/2018 | Bohrer et al. |
| 2007/0243007 | A1 | 10/2007 | Chang et al. |

FOREIGN PATENT DOCUMENTS

| | | | |
|---|---|---|---|
| CN | 202115160 | U | 1/2012 |
| CN | 204432079 | U | 7/2015 |
| CN | 205631827 | U | 10/2016 |
| CN | 106891640 | A | 6/2017 |
| CN | 106739658 | B | 4/2018 |
| CN | 207416362 | U | 5/2018 |
| CN | 107175956 | B | 5/2019 |
| CN | 110450563 | A | 11/2019 |
| CN | 212332235 | U | 1/2021 |
| KR | 200176087 | Y1 | 4/2000 |
| TW | M355169 | U | 4/2009 |
| WO | 2005120861 | A1 | 12/2005 |
| WO | 2010100800 | A1 | 9/2010 |
| WO | 2012023667 | A1 | 2/2012 |
| WO | 2019197544 | A1 | 10/2019 |

OTHER PUBLICATIONS

European Search Report issued in European Application No. 22 30 5582 on Sep. 6, 2022 (8 pages).

Macos, Kotobuki Co., Ltd., Copyright © 2023, http://koto-com.co.jp/en/macos/ (1 page).

* cited by examiner

[Fig.1]
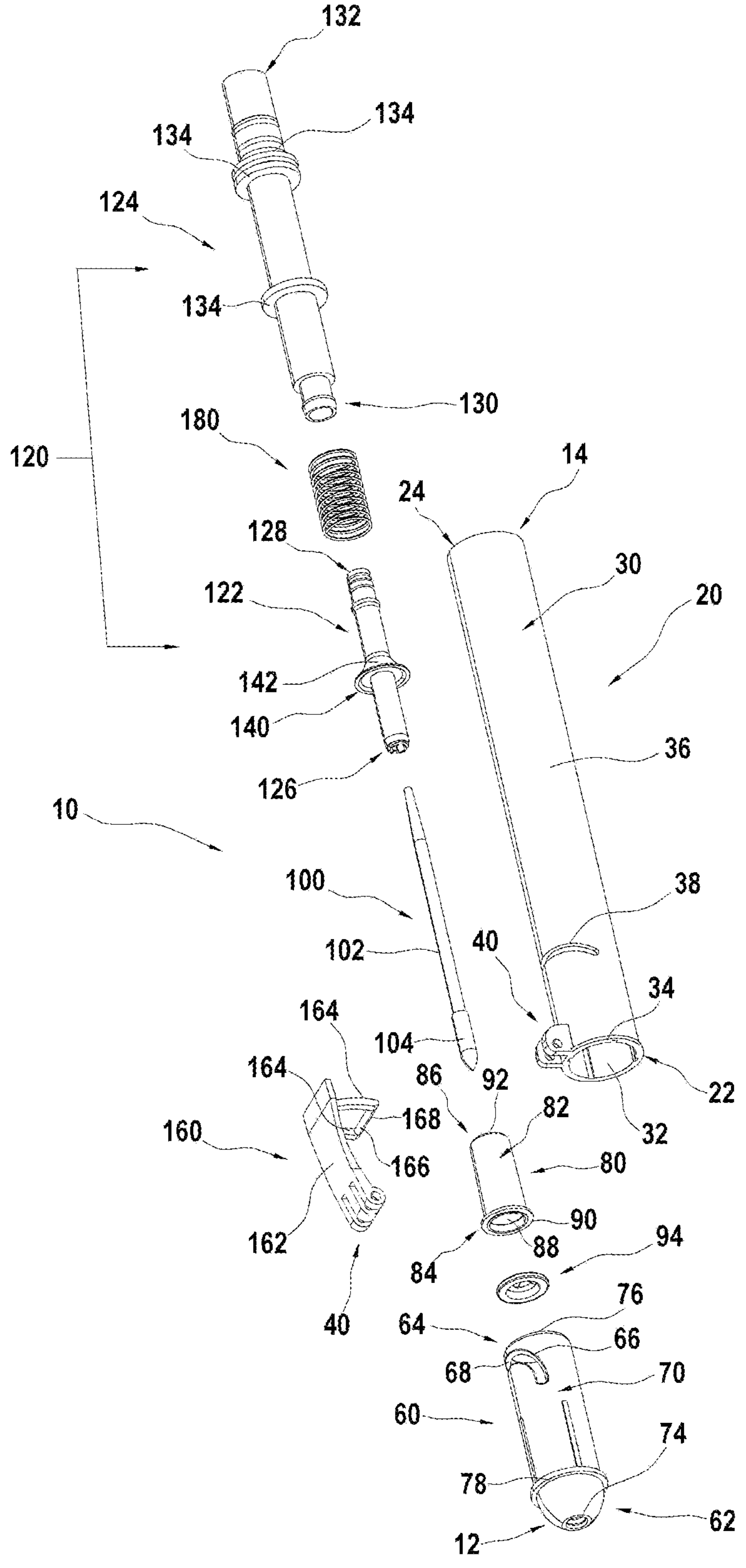

[Fig.2]
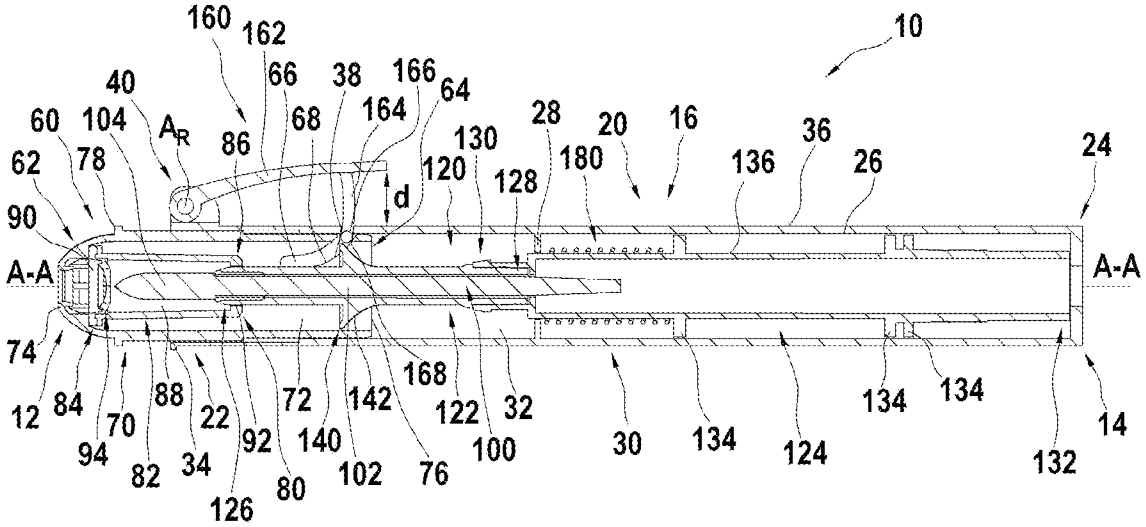
[Fig.3]
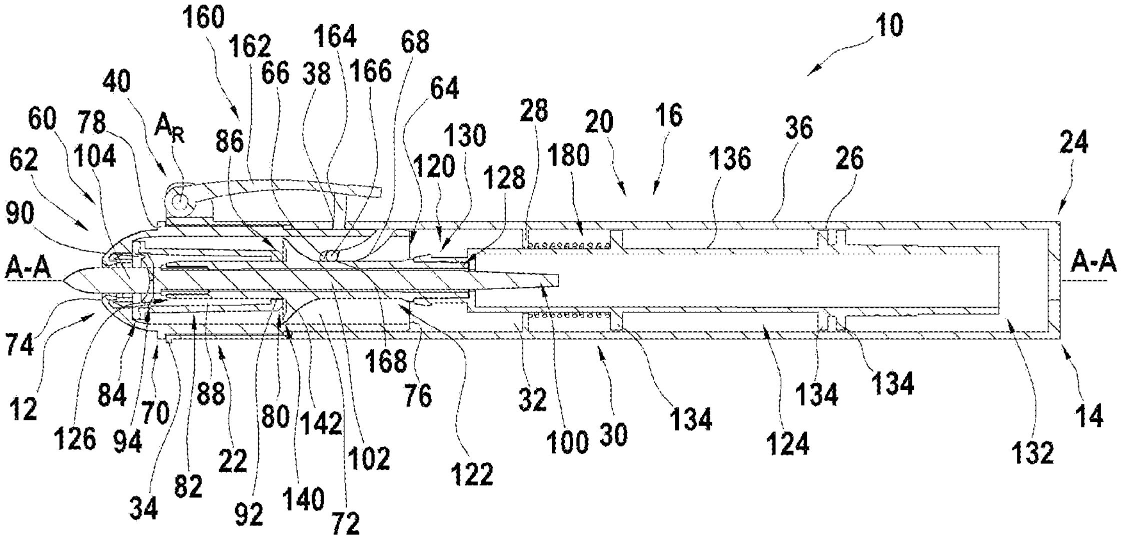

[Fig.4]
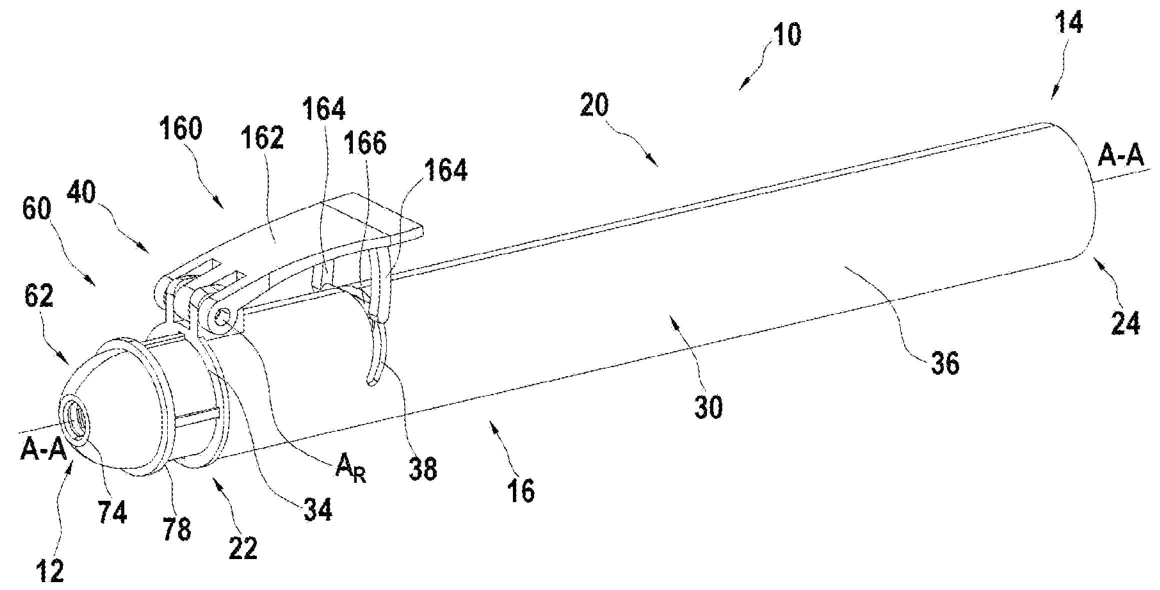
[Fig.5]
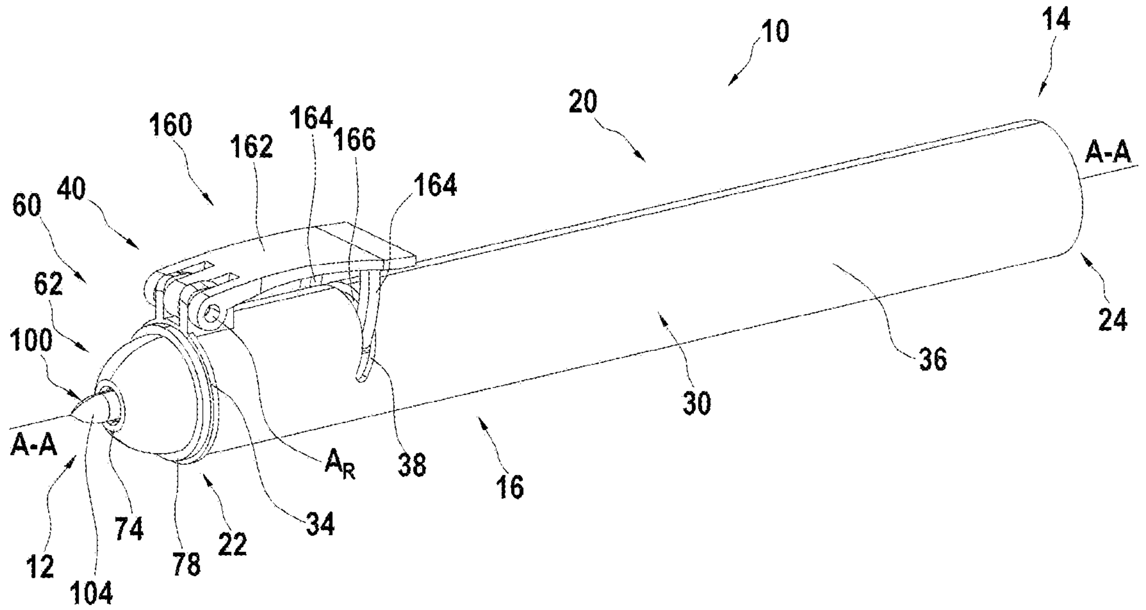

WRITING INSTRUMENT AND METHOD

CROSS REFERENCE TO RELATED APPLICATION

This application claims benefit from European patent application EP22305582.3 filed on 22 Apr. 2022, its content being incorporated herein by reference.

FIELD

The present disclosure relates to the field of writing instruments. More specifically, the present disclosure relates to a writing instrument configured to simplify functionality and improve ease of use.

BACKGROUND

A typical writing instrument may include one or more writing element disposed within a tubular housing. Examples of a writing element may include a ballpoint pen, a highlighter, a marker, a pencil, a stylus, and/or the like. Additionally, the writing element may be mechanically displaceable, so that the writing element and/or the writing tip thereof may be moved to a position outside or inside the housing.

In traditional writing instruments that include a cap, the cap may be easily misplaced, which may cause drying of the writing element and/or the writing tip thereof and, thus, a loss of functionality of the traditional writing instrument including a cap.

Further, in traditional writing instruments that include a mechanically displaceable writing element, the traditional writing instruments typically require several complex components and/or relationships, which results in increased modes of failure and/or increased complexity and cost of manufacture. Additionally, in traditional writing instruments that include a mechanically displaceable writing element, the traditional writing instruments typically require a user to manually and/or actively displace the writing element out of and into the housing, by way of a button, pusher element, and/or the like. Manual and/or active displacement of the writing element by the user requires increased thought, dexterity, and the use of fine motor skills (e.g. being able to isolate and/or move fingers of the hand independent of a palm of the hand) on the part of the user. As such, use of such a traditional writing instrument may be particularly difficult or frustrating for a toddler, a person having certain disabilities, a person wearing gloves, a person simultaneously holding an additional object, and/or the like. Additionally, the user may forget or be momentarily unable to retract and/or mechanically displace the writing element back into the housing and, thus, cause drying of the writing element and/or the writing tip thereof, thereby causing a loss of functionality of the traditional writing instrument including a mechanically displaceable writing element.

It is desirable to provide a writing instrument that includes structures and/or relationships configured to automatically displace a writing element of the writing instrument, so as to avoid usage of a cap and automatically protect the writing element and/or the writing tip thereof during non-use of the writing instrument, thereby simplifying functionality and improving ease of use of the writing instrument.

SUMMARY

According to aspects of the disclosure, a writing instrument extending along an axis between a first end and a second end is provided. The writing instrument includes a writing element configured to produce writing upon a surface and to transition between a non-writing state and a writing state, a first housing member oriented radially about at least a portion of the writing element and extending axially along the axis, a second housing member oriented radially about at least a portion of the writing element, at least a portion of the second housing member extending axially along the axis and the first housing member being oriented radially about at least a portion of the second housing member with respect to the axis, and an actuator configured to be moved radially between a first position and a second position with respect to the axis, wherein the actuator is configured to be moved by a user from the first position toward the second position and to be moved automatically from the second position toward the first position, the writing element is configured to transition from the non-writing state toward the writing state when the actuator is moved by the user from the first position toward the second position, and the writing element is configured to transition from the writing state to the non-writing state when the actuator automatically moves from the second position toward the first position, and wherein the second housing member is configured to move relative to the first housing member, axially between a first position and a second position, when the actuator moves between the first position and the second position.

According to aspects of the disclosure, the actuator may be configured to rotate about an axis of rotation.

According to aspects of the disclosure, the axis of rotation of the actuator may be arranged on the first housing member.

According to aspects of the disclosure, the actuator may include an arm and at least a portion of the arm may extend into the first housing member.

According to aspects of the disclosure, the arm of the actuator may be arcuate.

According to aspects of the disclosure, the first housing member may include an external wall and the external wall may define a radially-extending groove configured to receive at least a portion of the actuator.

According to aspects of the disclosure, the radially-extending groove of the first housing member may be arcuate.

According to aspects of the disclosure, the second housing member may include an external wall, the external wall may define a radially-extending groove configured to receive at least a portion of the actuator, and the external wall may include an engagement surface within the radially-extending groove configured to come into contact with the at least a portion of the actuator when the actuator is moved from the first position toward the second position of the actuator.

According to aspects of the disclosure, the engagement surface of the second housing member may be arcuate.

According to aspects of the disclosure, the writing instrument according to any aspect described herein may include a holder configured to receive and support the writing element.

According to aspects of the disclosure, the holder may include a radially-extending engagement element having an engagement surface configured to cooperate with a complimentary engagement element and/or engagement surface of the actuator when the actuator is moved from the first position toward the second position.

According to Aspects of the Disclosure, the Engagement Surface of the Holder May be Arcuate.

According to aspects of the disclosure, the second housing member and the holder may be configured to move in opposite directions of each other when the actuator is moved between the first position and the second position.

According to aspects of the disclosure, the writing element may be biased toward the non-writing state by a bias member.

According to aspects of the disclosure, the bias member may be positioned between the holder and the first housing member.

According to aspects of the disclosure, the bias member may be positioned between a radially-extending shoulder of the holder and a radially-extending shoulder of the first housing member.

According to aspects of the disclosure, the holder may include a first holder member and a second holder member and the radially-extending shoulder of the holder may be positioned on the second holder member.

According to aspects of the disclosure, the bias member may be configured to be compressed when force is applied by the actuator on the engagement surface of the radially-extending engagement element of the holder, and the bias member may be allowed to expand when the force is no longer applied by the actuator on the engagement surface of the radially-extending engagement element of the holder.

According to aspects of the disclosure, a method of operating a writing instrument is provided. The method includes providing the writing instrument according to any aspect disclosed herein, exerting force upon the actuator of the writing instrument to transition the writing element of the writing instrument to the writing state, and removing force from the actuator of the writing instrument to transition the writing element of the writing instrument to the non-writing state.

In the manner described and according to aspects illustrated herein, the writing instrument and the method are capable of automatically displacing the writing element of the writing instrument, so as to avoid usage of a cap and automatically protect the writing element and/or a writing tip thereof during non-use of the writing instrument, thereby simplifying functionality and improving ease of use of the writing instrument.

BRIEF DESCRIPTION OF THE DRAWINGS

Aspects of an embodiment will be described in reference to the drawings, where like numerals reflect like elements:

FIG. 1 is an exploded view of a writing instrument according to aspects of the disclosure;

FIG. 2 is a side cross-sectional view of the writing instrument according to FIG. 1, showing the writing instrument in a non-writing state;

FIG. 3 is a side cross-sectional view of the writing instrument according to FIG. 1, showing the writing instrument in a writing state;

FIG. 4 is a perspective view of the writing instrument according to FIG. 1, showing the writing instrument in the non-writing state; and FIG. 5 is a perspective view of the writing instrument according to FIG. 1, showing the writing instrument in the writing state.

DETAILED DESCRIPTION

An embodiment of a writing instrument and a method according to aspects of the disclosure will now be described with reference to FIGS. 1-5. Like numerals represent like parts, and the writing instrument will generally be referred to by the reference numeral 10. Although the writing instrument 10 is described with reference to specific examples, it should be understood that modifications and changes may be made to these examples without going beyond the general scope as defined by the claims. In particular, individual characteristics of the various embodiments shown and/or mentioned herein may be combined in additional embodiments. Consequently, the description and the drawings should be considered in a sense that is illustrative rather than restrictive. The Figures, which are not necessarily to scale, depict illustrative aspects and are not intended to limit the scope of the disclosure. The illustrative aspects depicted are intended only as exemplary.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

Various materials, methods of construction and methods of fastening will be discussed in the context of the disclosed embodiment(s). Those skilled in the art will recognize known substitutes for the materials, construction methods, and fastening methods, all of which are contemplated as compatible with the disclosed embodiment(s) and are intended to be encompassed by the appended claims.

As used in this disclosure and the appended claims, the singular forms "a," "an," and "the" include plural referents unless the content clearly dictates otherwise. As used in this disclosure and the appended claims, the term "or" is generally employed in its sense including "and/or" unless the content clearly dictates otherwise.

Throughout the description, including the claims, the terms "comprising a," "including a," and "having a" should be understood as being synonymous with "comprising one or more," "including one or more," and "having one or more" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially," "approximately," and "generally" should be understood to mean falling within such accepted tolerances.

When an element or feature is referred to herein as being "on," "engaged to," "connected to," or "coupled to" another element or feature, it may be directly on, engaged, connected, or coupled to the other element or feature, or intervening elements or features may be present. In contrast, when an element or feature is referred to as being "directly on," "directly engaged to," "directly connected to," or "directly coupled to" another element or feature, there may be no intervening elements or features present. Other words used to describe the relationship between elements or features should be interpreted in a like fashion (e.g., "between" versus "directly between," "adjacent" versus "directly adjacent," etc.).

Spatially relative terms, such as "top," "bottom," "middle," "inner," "outer," "beneath," "below," "lower," "above," "upper," and the like, may be used herein for ease of description to describe one element or feature's relationship to another element(s) or feature(s) as illustrated in the drawings. Spatially relative terms may be intended to encompass different orientations of a device in use or operation in addition to the orientation depicted in the drawings. For example, if the device in the drawings is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although the terms "first," "second," etc. may be used herein to describe various elements, components, regions, layers, sections, and/or parameters, these elements, components, regions, layers, sections, and/or parameters should not be limited by these terms. These terms are only used to distinguish one element, component, region, layer, or section from another region, layer, or section. Thus, a first element, component, region, layer, or section discussed herein could be termed a second element, component, region, layer, or section without departing from the teachings of the present disclosure.

As shown in FIGS. 1-2, a writing instrument 10 configured to simplify functionality and/or improve ease of use is provided. The term "writing instrument" as used herein may be understood to be a tool used to produce writing (e.g. figures, characters, lines, forms, and/or the like) upon a writing surface (not shown). In the disclosed embodiment, the writing instrument 10 extends from a first end 12 to a second end 14 along an axis A-A. The writing instrument 10 includes a housing 16 having a first housing member 20 extending axially between the first end 12 and the second end 14 of the writing instrument 10 and a second housing member 60 extending axially between the first end 12 and the second end 14 of the writing instrument 10. In examples, the housing 16 includes a tubular shape; however, it is contemplated that other shapes may be compatible with the writing instrument 10. The writing instrument 10 also includes a writing element 100 configured to produce writing upon the writing surface, an actuator 160 configured to mechanically displace at least a portion of the writing element 100 out of the housing 16, and a bias member 180 configured to mechanically displace at least a portion of the writing element 100 into the housing 16.

In this manner, by including the first housing member 20 and the second housing member 60 of the housing 16, the writing element 100, the actuator 160, and the bias member 180 according to aspects of the disclosure provided herein, the writing element 100 and, thus, the writing instrument 10, is configured to transition between a non-writing state (see FIGS. 2 and 4) and a writing state (see FIGS. 3 and 5). In the non-writing state, the writing element 100 is fully enclosed by the housing 16 and the writing element 100 is incapable of producing writing upon the writing surface. In the writing state, at least a portion of the writing element 100 extends out of the housing 16 and the writing element 100 is capable of producing writing upon the writing surface. Further, by including the first housing member 20 and the second housing member 60 of the housing 16, the writing element 100, the actuator 160, and the bias member 180 according to aspects of the disclosure herein, the writing element 100 and, thus, the writing instrument 10, is configured to transition from the writing state to the non-writing state automatically, in a manner that simplifies functionality and improves ease of use of the writing instrument 10. It is contemplated that the term "automatically" as used herein may be understood as not requiring input and/or further input from a user.

The first housing member 20, the second housing member 60, the writing element 100, and the bias member 180 are all configured to extend along the axis A-A of the writing instrument 10. As such, it is contemplated that the first housing member 20, the second housing member 60, the writing element 100, and the bias member 180 of the writing instrument 10 each include an axis which is common to and/or the same as the axis A-A of the writing instrument 10. As such, the axis of each of the first housing member 20, the second housing member 60, the writing element 100, and the bias member 180 of the writing instrument 10 will also be referred to herein as "the axis A-A."

The term "writing element" may be understood to be a component of the writing instrument 10 configured to contain and transfer a fluid-based writing medium (not shown), such as ink, to the writing surface (e.g. a highlighter, ballpoint pen, rollerball pen, fountain pen, marker, felt-tipped pen, and/or the like). Additionally or alternatively, the term "writing element" may be understood to be a component of the writing instrument 10 configured to contain and transfer a solid-type writing medium (not shown) or electronic-type writing medium to the writing surface (e.g. a pencil, chalk, charcoal, lead, active stylus, and/or the like).

In examples, the writing element 100 may be of a felt-tipped type. As such, referring to FIGS. 1-3, the writing element 100 may include a filler-type writing medium cartridge (also may be referred to herein as a "reservoir") 102, which is a writing medium cartridge that is manufactured from a porous material (not shown) for holding the writing medium, such as within the pores of the writing medium cartridge 102, without allowing the writing medium to flow freely, yet allowing the writing medium to be extracted, such as by a wick using capillary forces, for application to the writing surface. To this end, the writing element 100 may include a holder 120 oriented radially about at least a portion of the writing medium cartridge 102. It is contemplated that the term "radially" as used herein may be understood as a component, surface, position, region, direction, and/or the like that extends and/or moves substantially toward or away from the axis A-A. Additionally or alternatively, it is contemplated that the term "radially" as used herein may be understood as a component, surface, position, region, direction, and/or the like that extends substantially perpendicular and/or at an angle (inclined) with respect to the axis A-A. The holder 120 of the writing element 100 may be directly supported by the housing 16 of the writing instrument 10. Accordingly, the holder 120 may be manufactured from a rigid material, such as plastic and/or the like, which is capable of mating with other components of the writing instrument 10 and/or providing structural integrity to the writing medium cartridge 102.

As shown in FIGS. 2-5, the writing element 100 also includes a writing tip 104 (also may referred to herein as a "nib") configured to transfer the writing medium from the writing medium cartridge 102 to the writing surface. The writing tip 104 may be constructed of the same or substantially similar porous material as the writing medium cartridge 102. Due to the porosity of at least the writing medium cartridge 102 and the writing tip 104 of the writing element 100, in combination with direct exposure to areas that surround the writing element 100, prolonged exposure to an environment external to the writing instrument 10 (hereafter, "the external environment") may cause desiccation and/or drying of at least the writing medium cartridge 102 and the writing tip 104 of the writing element 100. It is contemplated that an environment external to the writing instrument 10 may be any area and/or surrounding environment external to and/or outside of the housing 16 of the writing instrument 10. Accordingly, enclosure of the writing element 100 within the housing 16 of the writing instrument 10 during non-use of the writing instrument 10 (i.e. the non-writing state) protects the writing element 100 from desiccation. Additionally, enclosure of the writing element 100 within the housing 16 of the writing instrument 10 during non-use of the writing instrument 10 (i.e. the non-writing state) allows for safe transportation of the writing instrument 10 without the risk of leakage. To this end and as will be discussed, the writing instrument 10 is configured for automatic retraction of the writing element 100 into the housing 16 of the writing instrument 10 (i.e. automatic transition of the writing element 100 from the writing state to the non-writing state).

Referring to FIGS. 1-3, the holder 120 of the writing element 100 is configured to be received within the housing 16 of the writing instrument 10. In particular, the holder 120 extends axially within the housing 16 of the writing instrument 10, between the first end 12 and the second end 14 of the writing instrument 10. Additionally, the holder 120 is configured to interact with aspects of the housing 16, the actuator 160, and the bias member 180, in order to carry and/or transition the writing element 100 between the non-writing state and the writing state. In examples, the holder 120 may include a first holder member 122 and a second holder member 124. The first holder member 122 and the second holder member 124 may be configured to couple with each other. Providing the first holder member 122 and the second holder member 124 as separate components configured to couple with each other facilitates assembly of the writing instrument 10. However, it is contemplated that the first holder member 122 and the second holder member 124 and, thus, the holder 120, may be integrally formed as one piece. The first holder member 122 extends between a first end 126 and a second end 128. Additionally, the second holder member 124 extends between a first end 130 and a second end 132. The first holder member 122 is positioned closer to the first end 12 of the writing instrument 10 than the second holder member 124 and the second holder member 124 is positioned closer to the second end 14 of the writing instrument 10 than the first holder member 122. To this end, the first end 126 of the first holder member 122 is positioned closer to the first end 12 of the writing instrument 10 than the second end 128 of the first holder member 122. The first end 130 of the second holder member 124 is positioned closer to the first end 12 of the writing instrument 10 than the second end 132 of the second holder member 124. In examples, the second end 128 of the first holder member 122 may be coupled to the first end 130 of the second holder member 124. To this end, the second end 128 of the first holder member 122 may be press-fit within the first end 130 of the second holder member 124. In examples, each of the first holder member 122 and the second holder member 124 may have a hollow tubular structure configured to receive and support the writing element 100.

As shown in FIGS. 2-3, the writing element 100 is directly supported in the writing instrument 10 by the holder 120. To this end, at least a portion of the writing medium cartridge 102 is received by the first holder member 122 in a surface-to-surface relationship. Additionally, the writing element 100 extends through the first holder member 122, such that the writing tip 104 of the writing element 100 extends out of the first end 126 of the first holder member 122. The first holder member 122 may be supported by the second holder member 124 by way of the coupling between the first holder member 122 and the second holder member 124. Additionally, the second holder member 124 is supported by the housing 16 of the writing instrument 10. In particular, the second holder member 124 is supported by the first housing member 20. To this end, the second holder member 124 includes one or more radially-extending shoulder 134 in a surface-to-surface relationship with an inner wall (also may be referred to herein as an "interior") 26 of the first housing member 20. Additionally or alternatively, the first housing member 20 includes one or more radially projecting shoulder 28 in a surface-to-surface relationship with an outer wall 136 of the second holder member 124. It is contemplated that the terms "inner" and "outer" as used herein may be understood with respect to the axis A-A, such that the term "inner" and/or "inwardly" refers to a component, surface, position, region, direction, and/or the like that is located or extends closer to or toward the axis A-A and the term "outer" and/or "outwardly" refers to a component, surface, position, region, direction, and/or the like that is located or extends further from or away from the axis A-A. In this manner, the holder 120 and, thus, the writing element 100, is supported within the housing 16.

As illustrated by FIGS. 2-5, the holder 120 and, thus, the writing element 100, is configured to be moved axially between a first position (see FIGS. 2 and 4) and a second position (see FIGS. 3 and 5). In particular, the holder 120 and, thus, the writing element 100, is configured to be moved axially in a first direction from the first position toward the second position and a second direction from the second position toward the first position. In examples, the first direction is a direction toward the first end 12 of the writing instrument 10 and/or away from the second end 14 of the writing instrument 10 and the second direction is a direction toward the second end 14 of the writing instrument 10 and/or away from the first end 12 of the writing instrument 10. Accordingly, in the second position, the holder 120 and, thus, the first end 126 of the first holder member 122 is closer to the first end 12 of the writing instrument 10 than when the holder 120 and, thus, the first end 126 of the first holder member 122 is in the first position. In this manner, the writing tip 104 of the writing element 100 is fully enclosed within the housing 16 of the writing instrument 10 when the holder 120 is in the first position (i.e. the non-writing state) and the writing tip 104 of the writing element 100 extends out of the housing 16 of the writing instrument 10 when the holder 120 is in the second position (i.e. the writing state).

In examples, the holder 120 is configured to move between the first position and the second position, so as to transition the writing element 100 between the non-writing state and the writing state, by way of a cam-type mechanism and/or relationship between the holder 120 and the actuator 160. To this end, the holder 120 includes a radially-extending engagement element 140 having an engagement surface 142 configured to cooperate with a complimentary engagement element 166 and/or engagement surface 168 of the actuator 160 (discussed further below). In examples, the engagement element 140 of the holder 120 is in the form of a radially-extending flange. The engagement surface 142 of the engagement element 140 of the holder 120 is configured to receive force applied by the actuator 160. Additionally, the engagement surface 142 of the engagement element 140 of the holder 120 is configured to apply return force exerted by the bias member 180.

In examples, the engagement element 140 of the holder 120 and/or the engagement surface 142 the holder 120 is arcuate. It is contemplated that the term "arcuate" as used herein may be understood as a component, surface, position, region, direction, and/or the like that is and/or includes a curve and/or incline. In particular, the engagement element 140 of the holder 120 and/or the engagement surface 142 of the holder 120 is arcuate and has a slope that decreases in a direction opposite of a corresponding slope of the complimentary engagement element 166 and/or engagement surface 168 of the actuator 160 and/or toward the second end 14 of the writing instrument 10. By the engagement element 140 of the holder 120 and/or the engagement surface 142 of the engagement element 140 of the holder 120 being arcuate, and having a slope that decreases in a direction opposite of a corresponding slope of the complimentary engagement element 166 and/or engagement surface 168 of the actuator 160, the holder 120 is capable of being moved from the first position toward the second position of the holder 120 when force is applied by the actuator 160 on the engagement surface 142 of the engagement element 140 of the holder 120, thereby transitioning the writing element 100 from the non-writing state toward the writing state. Additionally, the holder 120 is capable of being moved from the second position toward the first position of the holder 120 when force applied by the actuator 160 on the engagement surface 142 of the engagement element 140 of the holder 120 is removed, thereby transitioning the writing element 100 from the writing state toward the non-writing state.

In examples, the holder 120 is configured to be moved from the second position toward the first position of the holder 120 automatically, thereby transitioning the writing element 100 from the writing state toward the non-writing state automatically. To this end, the holder 120 is biased toward the first position. In particular, the holder 120 is biased toward the first position by the bias member 180. In examples, the bias member 180 is a coil spring; however, it is contemplated that other bias members may be compatible with the writing instrument 10. As shown in FIGS. 2-3, the bias member 180 is positioned between the holder 120 and the housing 16. In particular, the bias member 180 may be positioned between the second holder member 124 and the inner wall 26 of the housing 16. More in particular, the bias member 180 may be positioned between the radially-extending shoulder 134 of the holder 120 and the radially-extending shoulder 28 of the first housing member 20. As such, the radially-extending shoulder 134 of the holder 120 is axially-spaced from the radially-extending shoulder 28 of the first housing member 20. The bias member 180 is compressed when force is applied by the actuator 160 on the engagement surface 142 of the engagement element 140 of the holder 120, and the bias member 180 is allowed to expand when force applied by the actuator 160 on the engagement surface 142 of the engagement element 140 of the holder 120 is removed. When the bias member 180 expands, the bias member 180 pushes the radially-extending shoulder 134 of the second holder member 124 in the second direction of the holder 120, thereby moving the holder 120 in the second direction of the holder 120. In this manner, the writing instrument 10 is configured to transition the writing element 100 from the writing state to the non-writing state automatically, by the user removing force exerted on the actuator 160 and/or the engagement surface 142 of the engagement element 140 of the holder 120, so as to automatically protect the writing element 100 during non-use of the writing instrument 10.

As shown in FIGS. 1-3, the housing 16 of the writing instrument 10 includes the first housing member 20 and the second housing member 60. The first housing member 20 is configured to mate with the second housing member 60 to form the housing 16 of the writing instrument 10. In examples, the second housing member 60 is received concentrically within the first housing member 20. Additionally, the second housing member 60 extends axially within the first housing member 20, between the first end 12 and the second end 14 of the writing instrument 10. To this end, the first housing member 20 has a first diameter, the second housing member 60 has a second diameter, and the first diameter of the first housing member 20 is greater than the second diameter of the second housing member 60. At least a portion of the second housing member 60 (a first end 22 of the first housing member 20—discussed further below) may protrude out of the first housing member 20. The second housing member 60 may be interference-fit within the first housing member 20. However, the second housing member 60 is capable of movement within the first housing member 20 (see FIGS. 2-5). In this manner, the first housing member 20 and the second housing member 60 form the housing 16 of the writing instrument 10.

As shown in FIGS. 1-5, the first housing member 20 includes a body (also referred to herein as an "external wall") 30 extending between a first end 22 and a second end 24 of the first housing member 20. The body 30 of the first housing member 20 extends between the first end 22 and the second end 24 of the first housing member 20 between the first end 12 and the second end 14 of the writing instrument 10. In examples, the second end 24 of the first housing member 20 corresponds to the second end 14 of the writing instrument 10. Further, the first end 22 of the first housing member 20 is positioned at or adjacent to a first end 62 of the second housing member 60 (discussed further below).

The first housing member 20 is configured to be oriented radially about at least a portion of the writing element 100. Additionally, the first housing member 20 is configured to be oriented radially about at least a portion of the second housing member 60. To this end, the body 30 of the first housing member 20 defines a cavity 32 extending axially between the first end 22 and the second end 24 of the first housing member 20. At least a portion of the second housing member 60 and at least a portion of the writing element 100 are received within the cavity 32 of the first housing member 20. Further, at least a portion of the second housing member 60 and at least a portion of the writing element 100 each extend axially within the cavity 32 of the first housing member 20, between the first end 22 and the second end 24 of the first housing member 20. In examples, at least a portion of the second housing member 60 and at least a portion of the writing element 100 protrude out of the first end 22 of the first housing member 20. In particular, the first end 62 of the second housing member 60 and the writing tip 104 of the writing element 100 protrude out of the first end 22 of the first housing member 20. To this end, the body 30 of the first housing member 20 defines an opening 34 at the first end 22 of the first housing member 20 configured to allow at least a portion of the second housing member 60 and at least a portion of the writing element 100 to protrude out of the first end 22 of the first housing member 20. In this manner, the writing tip 104 of the writing element 100 is capable of extending out of and retracting into the housing 16 of the writing instrument 10.

In examples, the actuator 160 is configured to receive force exerted by the user to transition the writing element 100 from the non-writing state toward the writing state. In particular, the actuator 160 is configured such that the user may maintain force exerted on the actuator 160 during use of the writing instrument 10, while the writing element 100 is in the writing state. Accordingly, the actuator 160 extends from and/or is mounted to an outer wall (exterior) 36 of the first housing member 20. Additionally, the actuator 160 extends from and/or is mounted to a portion of the first housing member 20 that may be held by the user during use of the writing instrument 10. As such, the actuator 160 extends from and/or is mounted to the first housing member 20 at a position at or adjacent to the first end 22 of the first housing member 20.

The actuator 160 is configured to interact with aspects of the holder 120 of the writing element 100 and the second housing member 60 (i.e. the engagement surface 142 of the engagement element 140 of the first holder member 122 and an engagement surface 68 of the second housing member 60—discussed further below). To this end, the first housing member 20 defines a groove 38 configured to receive a portion of the actuator 160 (i.e. an arm 164 and/or the engagement element 166 of the actuator 160—discussed further below), such that the actuator 160 may extend from and/or be mounted to the outer wall 36 of the first housing member 20 while also engaging the holder 120 of the writing element 100 and the second housing member 60 within the first housing member 20. In examples, the groove 38 of the first housing member 20 is arcuate. In particular, the groove 38 of the first housing member 20 is arcuate and has a slope that decreases in a direction that is the same as a corresponding slope of the arm 166 of the actuator 160 (discussed further below) and/or toward the first end 12 of the writing instrument 10. In this manner, during actuation of the actuator 160 by the user, the actuator 160 (i.e. the arm 164 and/or the engagement element 166 of the actuator 160) may be moved radially-inwardly in the first housing member 20 to apply force upon the holder 120 of the writing element 100 and the second housing member 60 (i.e. the engagement surface 142 of the engagement element 140 of the first holder member 122 and the engagement surface 68 of the of the second housing member 60), thereby transitioning the writing element 100 from the non-writing state toward the writing state. Additionally, in this manner, during release of actuation of the actuator 160 by the user, the actuator 160 (i.e. the arm 164 and/or the engagement element 166 of the actuator 160) may be moved radially-outwardly in the first housing member 20, thereby allowing for transition of the writing element 100 from the writing state to the non-writing state.

As illustrated by FIGS. 2-5, the actuator 160 is configured to be moved between a first position (see FIGS. 2 and 4) and a second position (see FIGS. 3 and 5), so as to transition the writing element 100 between the non-writing state and the writing state, by way of a cam-type mechanism and/or relationship with one or more of the holder 120 and the second housing member 60. In examples, the actuator 160 is configured to transition the writing element 100 between the non-writing state and the writing state by way of a cam-type mechanism and/or relationship with both of the holder 120 and the second housing member 60. The actuator 160 is configured to be moved radially between the first position and the second position. To this end, in examples, the actuator 160 may be mounted to the first housing member 20 via a hinged connection 40. Accordingly, the actuator 160 may be configured to rotate about an axis of rotation $A_R$. In examples, the axis of rotation $A_R$ is located external to the first housing member 20.

The actuator 160 is configured to be moved from the first position toward the second position of the actuator 160 due to force exerted by the user on the actuator 160. Additionally, the actuator 160 is configured to be moved from the second position toward the first position of the actuator 160 due to force exerted by the user on the actuator 160 being removed by the user. Accordingly, the actuator 160 includes a pressing section 162 configured to receive force exerted by the user and/or to be pressed by the user. Additionally, the actuator 160 includes one or more arm 164 extending radially from the pressing section 162. The arm 164 extends from the pressing section 162 into the groove 38 defined by the first housing member 20. Additionally, the arm 164 extends into a groove 66 defined by the second housing member 60 (discussed further below).

The arm 164 of the actuator 160 extends to an engagement element 166 having an engagement surface 168. In the first position of the actuator 160, the engagement element 166 is farther from the axis A-A and the first end 12 of the writing instrument 10 than when the actuator 160 is in the second position. In the second position of the actuator 160, the engagement element 166 of the actuator 160 is closer to the axis A-A and the first end 12 of the writing instrument 10 than when the actuator 160 is in the first position. Additionally, in the first position of the actuator 160, the writing tip 104 of the writing element 100 is fully retracted and/or enclosed within the second housing member 60. In the second position of the actuator 160, the writing tip 104 of the writing element 100 extends out of the second housing member 60.

The engagement surface 168 of the engagement element 166 of the actuator 160 is configured to engage and/or apply force exerted by the user upon the pressing section 162 of the actuator 160 to the engagement surface 142 of the engagement element 140 of the first holder member 122 and a complimentary engagement element of the second housing member 60 (i.e. the engagement surface 68 within the groove 66 of the second housing member 60—discussed further below), when the actuator 160 moves from the first position toward the second position of the actuator 160. In examples, the engagement surface 168 of the engagement element 166 of the actuator 160 applies force exerted by the user upon the pressing section 162 of the actuator 160 to the engagement surface 142 of the engagement element 140 of the first holder member 122 and the complimentary engagement element of the second housing member 60 simultaneously. To this end, the engagement element 166 of the actuator 160 and/or the engagement surface 168 of the actuator 160 extends across an area that corresponds to the engagement surface 142 of the engagement element 140 of the first holder member 122 and the complimentary engagement element of the second housing member 60. In particular, the engagement element 166 of the actuator 160 and/or the engagement surface 168 of the actuator 160 extends across the groove 38 of the first housing member 20 to positions on each side of the first housing member 20 that are at or adjacent the inner wall 26 of the first housing member 20. Additionally or alternatively, the engagement element 166 of the actuator 160 and/or the engagement surface 168 of the actuator 160 has a length that is substantially the same as the diameter of the first housing member 20.

By applying force exerted by the user upon the pressing section 162 of the actuator 160 to the engagement surface 142 of the engagement element 140 of the first holder member 122 and the complimentary engagement element of the second housing member 60 simultaneously, the actuator 160 is capable of simultaneously moving the holder 120 and the second housing member 60 between first and second positions, respectively. In this manner, the writing element 100 is transitioned between the non-writing state and the writing state. Such a simultaneous movement reduces an axial and/or radial distance of movement d (see FIG. 2) of the actuator 160. Accordingly, a length of the arm 164 is reduced. Additionally, in this manner, a general diameter of the writing instrument (10) is reduced, thereby allowing for a comfortable and ergonomic grip for the user.

Referring to FIGS. 1-3, the second housing member 60 includes a body (also referred to herein as an "external wall") 70 extending axially between a first end 62 and a second end 64 of the second housing member 60. The body 70 of the second housing member 60 extends between the first end 62 and the second end 64 between the first end 12 and the second end 14 of the writing instrument 10. In examples, the first end 62 of the second housing member 60 corresponds to the first end 12 of the writing instrument 10. The second housing member 60 is configured to be oriented radially about at least a portion of the writing element 100. To this end, the body of the second housing member 60 defines a chamber 72 extending axially between the first end 62 and the second end 64 of the second housing member 60.

The second housing member 60 is configured to allow the writing element 100 to extend out of and retract into the housing 16 of the writing instrument 10. To this end, the body 70 of the second housing member 60 defines a first opening 74 at the first end of the second housing member 60. The first opening 74 of the second housing member 60 is configured to allow the writing element 100 to extend out of and retract into the housing 16 of the writing instrument 10. In particular, the first opening 74 of the second housing member 60 is configured to allow the writing tip 104 of the writing element 100 to extend out of and retract into the housing 16 of the writing instrument 10. Additionally, the body 70 of the second housing member 60 defines a second opening 76 at the second end 64 of the second housing member 60. The second opening 76 of the second housing member 60 is configured to receive at least a portion of the writing element 100. In particular, the writing tip 104, at least a portion of the writing medium cartridge 102, and at least a portion of the first holder member 122 of the holder 120 are received through the second opening 76 of the second housing member 60, so as to extend through the chamber 72 of the second housing member 60. More in particular, the engagement element 140 of the first holder member 122 is received within the chamber 72 of the second housing member 60 to be acted upon by the actuator 160. The chamber 72 of the second housing member 60 extends between and is in communication with the first opening 74 and the second opening 76 of the first housing member 20. In this manner, the writing element 100 is capable of transitioning to the writing state while also being protected from the external environment by the second housing member 60 when the writing element 100 is in the non-writing state.

Additionally or alternatively, referring to FIGS. 1-3, the second housing member 60 may include an inner compartment 80 configured to protect the writing tip 104 of the writing element 100 when the writing element 100 is in the non-writing state. The inner compartment 80 may be positioned concentrically within the second housing member 60. The inner compartment 80 may be configured to mate with the second housing member 60; however, it is contemplated that the second housing member 60 and the inner compartment 80 may be formed integrally in one piece. The inner compartment 80 includes a body 82 extending between a first end 84 and a second end 86 of the inner compartment. The body 82 of the inner compartment defines a space 88 configured to receive the writing element 100. In particular, the space 88 is configured to receive the writing tip 104 of the writing element 100, at least a portion of the writing medium cartridge 102 of the writing element 100, and at least a portion of the holder 120 of the writing element 100. In examples, the inner compartment 80 receives the first end 126 of the first holder member 122.

The inner compartment 80 includes a first opening 90 at the first end 84 of the inner compartment 80 and a second opening 92 at the second end 86 of the inner compartment 80. In this manner, the writing tip 104 of the writing element 100, at least the portion of the writing medium cartridge 102 of the writing element 100, and at least the portion of the holder 120 of the writing element 100 are received within the second end 86 of the inner compartment 80 so as to extend through the space 88 of the inner compartment. In examples, the first end 126 of the first holder member 122 is interference-fit with the second end 86 of the inner compartment 80. However, the first end 126 of the first holder member 122 is capable of axial movement through the inner compartment 80, so that the writing element 100 may transition between the non-writing state and the writing state.

In the non-writing state, the writing tip 104 of the writing element 100 is positioned within and/or enclosed by the inner compartment 80 and, thus, the second housing member 60. In the writing state, the writing tip 104 of the writing element 100 extends out of the inner compartment 80 and, thus, the second housing member 60. To this end, the first end 84 of the inner compartment 80 is positioned at or adjacent the first end 62 of the second housing member 60. The inner compartment 80 includes a seal member 94 at the first end 84 of the inner compartment 80 configured to protect the writing tip 104 and the writing medium cartridge 102 from desiccation when the writing element 100 is in the non-writing state. In examples, the seal member 94 may be flexible and/or capable of separating such that the writing tip 104 of the writing element 100 may extend through the seal member 94 and, thus, through the first opening 90 of the inner compartment and the first opening 74 of the second housing member 60. In this manner, the writing element 100 is protected when the writing element 100 is in the non-writing state but capable of transitioning to the writing state.

As shown in FIGS. 2-5, the second housing member 60 is configured to move axially between a first position (see FIGS. 2 and 4) and the second position (see FIGS. 3 and 5). In particular, the second housing member 60 is configured to be moved axially in a first direction from the first position toward the second position and a second direction from the second position toward the first position. In examples, the first direction is a direction toward the second end 14 of the writing instrument 10 and/or opposite the first direction of the holder 120 of the writing element 100. Additionally, the second direction is a direction away from the second end 14 of the writing instrument 10 and/or opposite the second direction of the holder 120. Accordingly, in the second position, the first end 62 of the second housing member 60 is closer to the second end 14 of the writing instrument 10 than when the second housing member 60 is in the first position. In this manner, the writing tip 104 of the writing element 100 is fully enclosed within the housing 16 of the writing instrument 10 when second housing member 60 is in the first position (i.e. the non-writing state) and the writing tip 104 of the writing element 100 extends out of the housing 16 of the writing instrument 10 when the second housing member 60 is in the second position (i.e. the writing state).

In examples, the second housing member 60 is configured to move between the first position and the second position, so as to transition the writing element 100 between the non-writing state and the writing state, by way of a cam-type mechanism and/or relationship between the second housing member 60 and the actuator 160. To this end, the second housing member 60 includes a radially and axially extending groove 66 including the engagement surface 68 configured to cooperate with the engagement element 166 and/or engagement surface 168 of the actuator 160. In examples, the groove 66 and/or engagement surface 68 of the second housing member 60 is arcuate. In particular, the groove 66 and/or the engagement surface 68 of the second housing member 60 is arcuate and has a slope that decreases in a direction opposite of the slope of the engagement element 140 and/or engagement surface 142 of the first holder member 122 of the holder 120 and/or toward the first end 12 of the writing instrument 10. By the groove 66 and/or the engagement surface 68 of the second housing member 60 having the slope that decreases in a direction opposite the slope of the engagement element 140 and/or the engagement surface 142 of the first holder member 122, the second housing member 60 and the holder 120 are configured to move in opposite directions when the actuator 160 is moved between the first position and the second position of the actuator 160.

The arm 164 and the engagement element 166 of the actuator 160 are received within the groove 66 of the second housing member 60, so that the engagement surface 168 of the actuator 160 may act upon the engagement surface 68 within the groove 66 of the second housing member 60. Additionally or alternatively, the arm 164 and the engagement element 166 of the actuator 160 are received within the groove 66 of the second housing member 60, so that the engagement surface 168 of the actuator 160 may act upon the engagement surface 142 of the first holder member 122 within the second housing member 60.

The engagement surface 68 of the second housing member 60 is configured to receive force applied by the engagement surface 168 of the engagement element 166 of the actuator 160 when the actuator 160 is moved from the first position toward the second position of the actuator 160. Force applied by the engagement surface 168 of the actuator 160 upon the engagement surface 68 of the second housing member 60 drives the second housing member 60 in the first direction of the second housing member 60, from the first position to the second position of the second housing member 60. To this end, the slope of the arm 164 of the actuator 160 is greater than the slope of the groove 66 and/or the engagement surface 68 of the second housing member 60. By the slope of the arm 164 of the actuator 160 being greater than the groove 66 and/or the engagement surface 68 of the second housing member 60, the actuator 160 is capable of applying force on the engagement surface 68 of the second housing member 60 when moving from the first position toward the second position of the actuator 160. Additionally, the second housing member 60 is capable of being moved from the first position toward the second position of the second housing member 60 when force is applied by the actuator 160 on the engagement surface 68 of the second housing member 60, thereby retracting the second housing member 60 into the first housing member 20 to transition the writing element 100 from the non-writing state toward the writing state. Additionally, the second housing member 60 is capable of being moved from the second position toward the first position of the second housing member 60 when force applied by the actuator 160 on the engagement surface 68 of the second housing member 60 is removed, thereby extending the second housing member 60 out of the first housing member 20 to transition the writing element 100 from the writing state toward the non-writing state. It is contemplated that the second housing member 60 may include an annular lip 78 configured to stop movement of the second housing member 60 into the cavity 32 of the first housing member 20 and/or seal the cavity 32 of the first housing member 20 when the second housing member 60 is in the second position of the second housing member 60.

Referring to FIGS. 2-5, in operation, to transition the writing element 100 and, thus, the writing instrument 10, from the non-writing state (see FIGS. 2 and 4) towards the writing state (see FIGS. 3 and 5), the user exerts force on the pressing section 162 of the actuator 160 to move the actuator 160 radially from the first position toward the second position of the actuator 160. As the actuator 160 moves radially from the first positon toward the second position of the actuator 160, the arm 164 of the actuator 160 moves further into the groove 38 of the first housing member 20 and the groove 66 of the second housing member 60. Additionally, as the actuator 160 moves from the first position toward the second position of the actuator 160, the engagement surface 168 of the engagement element 166 of the actuator 160 applies force exerted on the actuator 160 by the user to the engagement surface 142 of the engagement element 140 of the first holder member 122 of the holder 120 and the engagement surface 68 within the groove 66 of the second housing member 60 simultaneously.

Application of force by the engagement surface 168 of the engagement element 166 of the actuator 160 to the engagement surface 142 of the engagement element 140 of the first holder member 122 and the engagement surface 68 within the groove 66 of the second housing member 60 overcomes the biasing force of the bias member 180. Additionally, application of force by the engagement surface 168 of the engagement element 166 of the actuator 160 to the engagement surface 142 of the engagement element 140 of the first holder member 122 and the engagement surface 68 within the groove 66 of the second housing member 60 allows the engagement surface 168 of the engagement element 168 of the actuator 160 to slide along the respective slopes of the engagement surface 142 of the engagement element 140 of the first holder member 122 and the engagement surface 68 within the groove 66 of the second housing member 60.

As the engagement surface 168 of the engagement element 166 of the actuator 160 slides along the respective slopes of the engagement surface 142 of the engagement element 140 of the first holder member 122 and the engagement surface 68 within the groove 66 of the second housing member 60, the force applied by the actuator 160 pushes the first holder member 122 in the first direction of the holder 120 toward the first end 12 of the writing instrument 10 and the second housing member 60 in the first direction of the second housing member 60 toward the second end 14 of the writing instrument 10. As the first holder member 122 and the second housing member 60 move in opposite directions, the writing tip 104 of the writing element 100 extends through the seal member 94 included by the first end 84 of the inner compartment 80 of the second housing member 60 and out of the first opening 74 at the first end 62 of the second housing member 60. In this manner, the user is capable of transitioning the writing element 100 and, thus, the writing instrument 10 from the non-writing state toward the writing state. Additionally, by maintaining force exerted on the actuator 160, the user is capable of maintaining the writing element 100 and, thus, the writing instrument 10, in the writing state.

To transition the writing element 100 and, thus, the writing instrument 10, from the writing state toward the non-writing state, the user removes force exerted on the pressing section 162 of the actuator 160 to move the actuator 160 radially from the second position toward the first position of the actuator 160. When force exerted on the actuator 160 is removed, the bias member 180 expands to exert biasing force on the radially-extending shoulder 28 of the first housing member 20 and the radially-extending shoulder 134 of the second holder member 124. As the first housing member 20 is fixed with respect to the second holder member 124, the biasing force of the bias member 180 on the radially-extending shoulder 134 of the second holder member 124 pushes the second holder member 124 in the second direction of the holder 120 toward the second end 14 of the writing instrument 10.

Movement of the second holder member 124 in the second direction of the holder 120 also causes movement of the first holder member 122 and, thus, the writing element 100, in the second direction of the holder 120. Additionally, movement of the holder 120 in the second direction of the holder 120 causes the engagement surface 142 of the engagement element 140 of the first holder member 122 to exert return force on the engagement surface 168 of the engagement element 166 of the actuator 160. Accordingly, the actuator 160 is moved from the second position toward the first position of the actuator 160. Additionally, return force exerted on the engagement surface 168 of the engagement element 166 of the actuator 160 causes the engagement surface 168 of the engagement element 166 of the actuator 160 to apply the return force to the engagement surface 68 within the groove 66 of the second housing member 60. Due to the slope of the engagement surface 68 within the groove 66 of the second housing member 60, return force applied by the engagement surface 168 of the engagement element 166 of the actuator 160 to the engagement surface 68 within the groove 66 of the second housing member 60 causes the second housing member 60 to move from the second position toward the first position of the second housing member 60.

The writing element 100 is moved in the second direction of the holder 120 toward the second end 14 of the writing instrument 14 and the second housing member 60 is moved in the second direction of the second housing member 60 away from the second end 14 of the writing instrument 10, thereby retracting the writing tip 104 of the writing element 100 into the second housing member 60, through the seal member 94, and into the inner compartment 80 of the second housing member 60. In this manner, the writing element 100 and, thus, the writing instrument 10 is configured to transition from the writing state toward the non-writing state automatically, so as to avoid usage of a cap and to automatically protect the writing element 100 during non-use of the writing instrument 10, thereby simplifying functionality and improving ease of use of the writing instrument 10.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

Additionally, all of the disclosed features of an apparatus may be transposed, alone or in combination, to a method and vice versa.

The invention claimed is:

1. A writing instrument extending along an axis between a first end and a second end, the writing instrument comprising:

a writing element configured to produce writing upon a surface and to transition between a non-writing state and a writing state;

a first housing member oriented radially about at least a portion of the writing element and extending axially along the axis;

a second housing member oriented radially about at least a portion of the writing element, at least a portion of the second housing member extending axially along the axis, and the first housing member being oriented radially about at least a portion of the second housing member with respect to the axis;

a holder configured to receive and support the writing element; and an actuator configured to be moved radially between a first position and a second position with respect to the axis;

wherein the actuator is configured to be moved by a user from the first position toward the second position and to be moved automatically from the second position toward the first position, the writing element is configured to transition from the non-writing state toward the writing state when the actuator is moved by the user from the first position toward the second position, and the writing element is configured to transition from the writing state to the non-writing state when the actuator automatically moves from the second position toward the first position, wherein the second housing member is configured to move relative to the first housing member, axially between a first position and a second position, when the actuator moves between the first position and the second position, and wherein the second housing member and the holder are configured to move in opposite directions of each other when the actuator is moved between the first position and the second position.

2. The writing instrument of claim 1, wherein the actuator is configured to rotate about an axis of rotation.

3. The writing instrument of claim 2, wherein the axis of rotation of the actuator is arranged on the first housing member.

4. The writing instrument of claim 1, wherein the actuator includes an arm and at least a portion of the arm extends into the first housing member.

5. The writing instrument of claim 4, wherein the arm of the actuator is arcuate.

6. The writing instrument of claim 1, wherein the first housing member includes an external wall and the external wall defines a radially-extending groove configured to receive at least a portion of the actuator.

7. The writing instrument of claim 6, wherein the radially-extending groove of the first housing member is arcuate.

8. The writing instrument of claim 7, wherein the external wall of the second housing member includes an engagement surface within the radially-extending groove configured to come into contact with the at least a portion of the actuator when the actuator is moved from the first position toward the second position.

9. The writing instrument of claim 8, wherein the engagement surface of the second housing member is arcuate.

10. The writing instrument of claim 1, wherein the second housing member includes an external wall, the external wall defines a radially-extending groove configured to receive at least a portion of the actuator.

11. The writing instrument of claim 1, wherein the holder includes a radially-extending engagement element having an engagement surface configured to cooperate with a complimentary engagement element and/or engagement surface of the actuator when the actuator is moved from the first position toward the second position.

12. The writing instrument of claim 11, wherein the engagement surface of the holder is arcuate.

13. The writing instrument of claim 1, wherein the writing element is biased toward the non-writing state by a bias member.

14. The writing instrument of claim 13, wherein the bias member is configured to be compressed when force is applied by the actuator on an engagement surface of a radially-extending engagement element of the holder, and the bias member is configured to be expanded when the force is no longer applied by the actuator on the engagement surface of the radially-extending engagement element of the holder.

15. The writing instrument of claim 13, wherein the bias member is positioned between the holder and the first housing member.

16. The writing instrument of claim 15, wherein the bias member is positioned between a radially-extending shoulder of the holder and a radially-extending shoulder of the first housing member, and the bias member is configured to be compressed when force is applied by the actuator on an engagement surface of a radially-extending engagement element of the holder, and the bias member is configured to be expanded when the force is no longer applied by the actuator on the engagement surface of the radially-extending engagement element of the holder.

17. The writing instrument of claim 1, wherein the holder includes a first holder member and a second holder member, a radially-extending shoulder of the holder being positioned on the second holder member.

18. A method of operating a writing instrument including, providing the writing instrument of claim 1, exerting a force upon the actuator of the writing instrument to transition the writing element to the writing state, and removing the force from the actuator of the writing instrument to transition the writing element to the non-writing state.

19. A writing instrument extending along an axis between a first end and a second end, the writing instrument comprising:

a writing element configured to produce writing upon a surface and to transition between a non-writing state and a writing state, wherein the writing element is biased toward the non-writing state by a bias member;

a first housing member oriented radially about at least a portion of the writing element and extending axially along the axis;

a second housing member oriented radially about at least a portion of the writing element, at least a portion of the second housing member extending axially along the axis, and the first housing member being oriented radially about at least a portion of the second housing member with respect to the axis;

a holder configured to receive and support the writing element; and an actuator configured to be moved radially between a first position and a second position with respect to the axis;

wherein the actuator is configured to be moved by a user from the first position toward the second position and to be moved automatically from the second position toward the first position, the writing element is configured to transition from the non-writing state toward the writing state when the actuator is moved by the user from the first position toward the second position, and the writing element is configured to transition from the writing state to the non-writing state when the actuator automatically moves from the second position toward the first position, wherein the bias member is positioned between the holder and the first housing member, and wherein the second housing member is configured to move relative to the first housing member, axially between a first position and a second position, when the actuator moves between the first position and the second position.

20. A writing instrument extending along an axis between a first end and a second end, the writing instrument comprising:

a writing element configured to produce writing upon a surface and to transition between a non-writing state and a writing state;

a first housing member oriented radially about at least a portion of the writing element and extending axially along the axis;

a second housing member oriented radially about at least a portion of the writing element, at least a portion of the second housing member extending axially along the axis, and the first housing member being oriented radially about at least a portion of the second housing member with respect to the axis;

a holder configured to receive and support the writing element, wherein the holder includes a first holder member and a second holder member, and a radially-extending shoulder of the holder being positioned on the second holder member; and an actuator configured to be moved radially between a first position and a second position with respect to the axis;

wherein the actuator is configured to be moved by a user from the first position toward the second position and to be moved automatically from the second position toward the first position, the writing element is configured to transition from the non-writing state toward the writing state when the actuator is moved by the user from the first position toward the second position, and the writing element is configured to transition from the writing state to the non-writing state when the actuator automatically moves from the second position toward the first position, and wherein the second housing member is configured to move relative to the first housing member, axially between a first position and a second position, when the actuator moves between the first position and the second position.

* * * * *